United States Patent Office 3,356,658
Patented Dec. 5, 1967

3,356,658
PROCESSES FOR SULFUR CURING ETHYLENE/ VINYL CHLORIDE COPOLYMERS
Harry M. Andersen, Ballwin, Harry P. Holladay, Creve Coeur, and John H. Johnson, Kirkwood, Mo., assignors to Monsanto Company, a corporation of Delaware
No Drawing. Filed Oct. 21, 1963, Ser. No. 317,764
17 Claims. (Cl. 260—79.5)

This invention relates to processes for sulfur curing ethylene/vinyl chloride copolymers to form elastomeric materials having improved strength, elongation, dimensional stability, solvent resistance, etc.

Ethylene/vinyl chloride copolymers may be prepared by conventional mass, emulsion, solution, or suspension polymerization techniques and initiation may be by either thermal dissociation of a suitable peroxy compound, by a redox system, or with ionic and Ziegler type catalysts. Reference is made to U.S. 2,422,392, U.S. 2,497,291, U.S. 3,035,032, and U.S. 3,051,689 for specific examples of processes for preparing the copolymer.

The art on curing these copolymers comprises U.S. 2,497,291 which states that curing agents may be added to ethylene/vinyl chloride copolymers and U.S. 2,628,214 which further suggests that copolymers of ethylene and vinyl chloride can be crosslinked with free-radical-generating curatives, e.g., peroxides.

It is an object of the present invention to provide a new and more useful process for crosslinking ethylene/vinyl chloride copolymers.

Another object of this invention is to provide a process for curing ethylene/vinyl chloride copolymers which process produces a product having superior properties to the product formed with a peroxide-type cure system.

Another object is to provide, as a composition of matter, ethylene/vinyl chloride copolymers which have been vulcanized with sulfur according to the present processes.

Another object is to provide a process for vulcanizing ethylene/vinyl chloride copolymers which process is suitable for commercial operations.

Another object is to provide a process for curing ethylene/vinyl chloride copolymers which is applicable whether or not fillers and/or plasticizers are employed to modify the resin.

Another object is to provide a process for crosslinking ethylene/vinyl chloride copolymers to give elastomers having high tensile strengths and elongations.

Another object is to provide a process for preparing ethylene/vinyl chloride vulcanizates wherein the ethylene/vinyl chloride copolymer does not suffer degradation and decomposition during the crosslinking operation.

Another object is to provide a process for curing copolymers of ethylene and vinyl chloride where the cured product has useful physical properties over a wide temperature range.

The objects set forth above and others, which will be evident to those skilled in the art from the detailed description of the invention which follows, have been accomplished in a process which employs a sulfur cure system to produce crosslinked ethylene/vinyl chloride copolymers.

It was most surprising that such a process could be developed, considering that sulfur cure systems will not function to crosslink seemingly related polymers, i.e., polyethylene, polyvinyl chloride, ethylene/vinyl acetate copolymer, etc.

The ethylene/vinyl chloride copolymers included within the scope of this invention have properties ranging from modified polyethylene to modified polyvinyl chloride. Copolymer compositions can contain about 5 mole percent vinyl chloride up to about 95 mole percent vinyl chloride and include semicrystalline polymers, i.e., those with about 5 to 20 mole percent vinyl chloride; rubbery polymers, i.e., those with about 20 to 40 mole percent vinyl chloride; soft thermoplastics, i.e., those with about 40 to 60 mole percent vinyl chloride; and semi-rigid to rigid thermoplastics, i.e., those with about 60 to 95 mole percent vinyl chloride.

Preferred ethylene/vinyl chloride compositions for use in preparing vulcanizates are the rubbery and soft thermoplastic polymers, i.e., those which contain from about 20 to 65 mole percent vinyl chloride. However elastomers having more or less combined vinyl chloride may be preferred for certain applications.

Vulcanizable ethylene/vinyl chloride compositions usually contain fillers (i.e., diluents, reinforcing agents, pigments, etc.) which are used to extend or modify the basic copolymer.

Carbon black is often added to the ethylene/vinyl chloride copolymer during compounding as a filler. There are many types of carbon blacks used today as fillers, among which are super abrasion furnace blacks, intermediate super abrasion furnace blacks, semi-reinforcing furnace blacks, very fine furnace blacks, high elongation furnace blacks, conductive furnace blacks, fully reinforcing furnace blacks, high abrasion furnace blacks, general furnace blacks, and high modulus furnace carbon blacks; all-purpose channel blacks, conductive channel blacks, easy processing channel blacks, medium processing channel blacks, and hard processing channel blacks; fine thermal blacks and medium thermal blacks; lamp blacks; acetylene carbon blacks, etc.

Other common fillers which can be employed include wood flour, shell flour, cotton flock, signal fibers, chopped paper, macerated fabrics, keratin products, lignin fillers, soybean meal, synthetic fibers, asbestos, mica, quartz, limestone, silica, clays, diatomaceous earth, fibrous glass, calcium carbonate, calcium silicate, alumina, zinc oxide, barium sulfate, titanium dioxide, talc, cork, carborundum, iron oxide, zinc sulfide, etc.

As a general rule best strength is achieved where the filler is employed in about 50 parts per 100 parts of copolymer. However, this value is only a guideline and from about 25 to 100 parts filler may be preferred for certain applications. As little as about 1 to 10 parts can sometimes be used to advantage. On the other hand for certain applictaions best economic advantage is attained by adding from about 250 to 550 parts filler.

Additionally common plasticizers (i.e., softeners) can advantageously be added to modify the ethylene/vinyl chloride copolymers. Examples include phosphoric acid esters, esters of phthalate acid, esters of adipic acid, esters of azelaic acid, esters of oleic acid, esters of sebacic acid, palm oil, rape oil, olive oil, linseed oil, castor bean oil, soya bean oil, tung oil, mineral rubbers, high boiling petroleum residues, asphalts, pine tar, paraffin wax, mineral oils (aromatic, paraffinic or naphthenic), coal tar oils, fatty acids, naphthalenes, rosin, wool grease, carnauba wax, ceresin, glycerol esters, coumarone resins, styrene resins, phenol-formaldehyde resins, esters of fumaric acids, polyphenyls, chlorinated polyphenyls, chlorinated polyethylene, aromatic fractions from petroleum, butyl rubber, etc.

These plasticizers are generally added to the vulcanizable copolymers only to a limited extent, i.e., in amounts sufficient to produce the desired properties. Commonly the amount of plasticizer used comes to about 10 to 30 parts based on 100 parts of copolymer. However, as little as 1 to 5 parts may be effective. Also sometimes special conditions require as much as about 60 parts.

The sulfur is generally used in the elemental form as the ground sulfur of commerce. Sulfur compounds capable of liberating sulfur at vulcanizing temperatures are also used to effect vulcanization. The principal members of this group are bis(dimethylthiocarbamoyl)disulfide and its homologs, the corresponding tetrasulfide, dipentamethylene tetrasulfide, 4,4'-dithiodimorpholine, alkyl phenol sulfides, sulfur chloride, hydrogen sulfide, sulfur thiocyanate, etc. Sulfur compounds should be soluble in the copolymer or available in a finely divided form so that they can be readily and uniformly dispersed in the copolymer.

A typical formulation would include about 0.5 to 5 or more parts of sulfur for each 100 parts of crosslinkable copolymer. Generally about 1 to 3 parts of sulfur provides satisfactory crosslinking. Where a sulfur containing compound is used as the source of sulfur its sulfur content should fall within the above designated range.

Accelerators are added to the crosslinkable ethylene/vinyl chloride copolymer to increase the rate of vulcanization. In general good accelerators also give "flatter" cures, improve tensile strength, set, hysteresis, and aging, and make possible a wider range in the combination of properties obtainable. Accelerators can be divided into 4 principal chemical groups: mercaptothiazoles and derivatives; dithiocarbamates and bis(thiocarbamoyl)sulfides, i.e., the thiuram sulfides; guanidines; and aldehyde-amine reaction products. A fifth miscellaneous group comprises various classes generally of secondary importance, e.g., xanthates, thioureas, and mercaptothiazolines. Specific examples include: 2-mercaptobenzothiazole, 2,2'-dithiobenzothiazole, N-cyclohexyl-2-benzothiazolesulfenamide, zinc diethyldithiocarbamate, tetramethylthiuram disulfide, tetramethylthiuram, monosulfide, 1,3-diphenylguanidine, butyraldehyde-aniline condensation product, tellurium diethyldithiocarbamate, selenium diethyl dithiocarbamate, zinc dimethyl dithiocarbamate, etc. The dithiocarbamates and the bis(thiocarbamoyl)sulfides function as ultra-accelerators and are preferred for present purposes.

The accelerator or the combination of accelerators is generally used in an amount about equal to 2 times the amount of sulfur in the cure formulation, however more or less may be used. Thus commonly the cure formulation will contain from about 0.5 to 5 parts of accelerator(s) per 100 parts of copolymer. Preferably however, there will be from about 1 to 3 parts of accelerator(s) in the cure recipe.

Where desired activators, e.g., stearic acid, aniline, animal fatty acid, antimony sulfide, caprylic acid, coconut fatty acid, diethanolamine, hydroxystearic acid, basic lead carbonate, lead salicylate, oleic acid, p-quinone dioxime, ricinoleic acid, tetrachlorobenzoquinone, zinc palmitate, zinc stearate, lead carbonate, lead oxide, magnesium oxide, etc., can be included in the cure recipe. These substances generally are not accelerators when used alone, but in conjunction with a primary accelerator they increase the rate of vulcanization over that which is obtained with only the primary accelerator. The general argument for the use of an activator is that a fast cure rate may be obtained more economically by using a combination of accelerator and activator than by using a higher concentration of the accelerator. One to 3 parts of activator based on 100 parts of copolymer is generally sufficient for this purpose though more is desirable in some cases.

In most cases it is the practice to add stabilizers to the vulcanizable ethylene/vinyl chloride copolymer during the mixing step of processing in order to prevent, retard, or modify to an unobjectionable form, degradation that might take place during processing and/or give satisfactory service life to the polymer by preventing or retarding degradation during use caused by the effects of oxidation, heat or light.

Many classes of compounds would be useful stabilizers of the present compositions. These include substituted phenols and bisphenols, amines, mercaptides and sulfides, phosphites, epoxies, phosphates, polyols, and inorganic and organometallic compounds. Since reactions which take place during polymer degradation are caused by a variety of factors, often a multicomponent stabilizer system will be useful.

Examples include the following: diphenylamine; reaction products of acetone with aniline or substituted anilines; reaction products of diphenylamine with acetone; derivatives of p-phenylenediamine; phenols alkylated with isobutylene or styrene; alkylated di-phenolics; reaction products of sulfur chloride and alkylated phenols, alkylated aryl phosphites; epoxidized natural oils; epoxidized esters of unsaturated acids; epoxy resins, pentaerythritol, glycerine, organometallic compounds based upon sodium, calcium, barium, strontium, cadmium, zinc, antimony, tin, lead, magnesium, aluminum and titanium; inorganic lead salts such as carbonates and silicates; etc.

The sum total of stabilizer(s) incorporated into the copolymer generally does not exceed about 10 parts per hundred parts of copolymer and usually is about 1 to 5 parts.

The vulcanizable ethylene/vinyl chloride copolymer is cured by applying heat thereto until the desired degree of crosslinking is achieved. Cure temperature depends on the accelerator employed and will generally be on the order of about 150° to 450° Fahrenheit. The preferred temperature range is from about 250° to 350° Fahrenheit.

The cure time depends on the cure temperature, i.e., where high temperatures are employed the optimum cure time will be shorter than when the copolymer is vulcanized at lower temperatures. Vulcanization time also depends on the size of the sample being cured, the presence or absence of an activator, the particular accelerator employed, etc. However, vulcanization time will usually be on the order of about ⅓ to 150 minutes. Optimum cure time at about 320° Fahrenheit is usually about 15 to 45 minutes.

The crosslinked copolymers prepared by this invention have utility for many purposes, e.g., coatings fabrics and paper; as water resistant adhesives; for the preparation of molded articles; safety glass interlayers; protective coatings for vats, tanks, food cans, etc.; wire insulation, elastomeric materials; etc.

Various changes may be made in the details of this invention without departing therefrom or sacrificing any of the advantages thereof. For example it is possible to cure ethylene/vinyl chloride polymers containing a third polymer component under conditions substantially the same as hereinbefore described. The third component should not be present in an amount exceeding about 15 weight percent based on the combined monomers.

In the following examples "E/VCl" is used as an abbreviation for ethylene/vinyl chloride copolymer. The superscript "$t$" is used to denote a trademark or brand name.

EXAMPLE 1.—BUTYL-SULFUR CURES OF E/VCl

A typical butyl rubber cure system was used to cure E/VCl latex (Table 1). Films of the cure formulation are cast on glass and allowed to dry overnight before curing. The degree of cure obtained is indicated by the insolubility of the cured film in 50:50 methyl isobutyl ketone-toluene solvent.

TABLE 1.—E/VCl LATEX RUBBER CURES

[E/VCl Latex—57.0 mole percent VCl, 50.6% polymer solids]

| Formula (Parts Dry):[1] | | | | | | |
|---|---|---|---|---|---|---|
| E/VCl | | | | 100 | 100 | 100 |
| Thiotax [t] | | | | 0.5 | 0.5 | 0.5 |
| Thiurad [t] | | | | 1.0 | 1.0 | 1.0 |
| Sulfur | | | | 2.0 | 2.0 | 2.0 |
| Zinc Oxide | | | | 2.0 | 2.0 | 2.0 |
| Stearic Acid | | | | 1.0 | 1.0 | 1.0 |
| Cure: | | | | | | |
| Time (min.) | 30 | 30 | 60 | 30 | 30 | 60 |
| Temp. (° F.) | 320 | 302 | 302 | 320 | 302 | 302 |
| Solubility: 50:50 methyl isobutyl ketone-toluene | Sol. | Sol. | Sol. | Insol. (Swelled) | Partly Sol. | Insol. (Swelled) |

[1] Thiotax=2-mercaptobenzothiazole; Thiurad=tetramethylthiuram disulfide.

Additional results of butyl-type sulfur cures (i.e., sulfur cures with accelerators) are presented in Table II. A pentaerythritol-ZnO system is employed as stabilizer.

with solid E/VCl at 50 parts loading was made to determine ones yielding best physical properties (Table III).

TABLE II.—BUTYL-SULFUR CURES OF E/VCl

| Mole percent VCl in E/VCl | 41 | 41 | 53.4 | 53.4 | 34.8 | 34.8 | 57.7 | | |
|---|---|---|---|---|---|---|---|---|---|
| Cure Formula: [a] | | | | | | | | | |
| Polymer | 100 | 100 | 100 | 100 | 100 | 100 | 100 | | |
| Philblack O [t] | | | | 50 | 50 | 50 | 50 | | |
| Stearic Acid | 1 | 1 | 1 | 1 | 1 | 1 | 1 | | |
| ZnO | 5 | 5 | 5 | 5 | 5 | 5 | 5 | | |
| Sulfur | 1.5 | 1.5 | 1.5 | 1.5 | 1.5 | 1.5 | 1.5 | | |
| Tellurac [t] | 2 | 2 | 2 | 2 | 2 | 1 | 2 | | |
| Thiotax [t] | 1 | 1 | 1 | 1 | 1 | | | | |
| Mertax [t] | | | | | | 0.5 | | | |
| Pentaerythritol | | 7 | 7 | 7 | 4 | 4 | 1 | | |
| Elastopar [t] | 1.5 | 1.5 | | | | | 4 | | |
| Money Cure Results: [b] | | | | | | | | | |
| Cure Temp. (° F.) | 320 | 320 | 310 | 310 | 310 | 310 | | | |
| t₅ (min.) | 2.25 | 3.35 | 5.35 | 3.45 | 2.20 | 2.60 | | | |
| Δt₃₀ (min.) | 1.50 | 2.34 | 3.45 | 2.60 | 3.10 | 7.25 | | | |
| Optimum Cure (min.) | 11.25 | 17.90 | 26.05 | 19.05 | 20.80 | 46.1 | | | |
| Press Cure Results: [c] | | | | | | | | | |
| Cure Temp. (° F.) | | | 310 | 310 | 310 | 310 | 310 | 310 | |
| Cure Time (min.) | | | 26 | 19 | 20 | 15 | 30 | 45 | |
| Percent Elong. | | | 520 | 175 | 48 | 183 | 173 | 173 | |
| Percent Retained Elong. | | | 12 | 8 | 0 | 24 | 18 | 14 | |
| Tensile, lbs./in.² | | | 2,070 | 3,300 | 1,462 | 1,670 | 1,721 | 1,703 | |

(Additional columns at right:)

| | 310 | 290 | 290 |
|---|---|---|---|
| | 7.5 | 10 | 20 |
| | 263 | 297 | 240 |
| | 17 | 27 | 13 |
| | 2,663 | 2,325 | 2,750 |

[a] Philblack O=high abrasion oil furnace black; Tellurac=tellurium diethyldithiocarbamate; Mertax=2-mercaptobenzothiazole; Elastopar=N-methyl-N, 4-dinitrosoaniline (1 part) plus clay filler (2 parts).
[b] Cure time=$t_5+6\Delta t_{30}$; ASTM D1646-59T.
[c] ASTM D412-51T, Die C.

No degradation or HCl evolution is noted and fast cure rates are the rule.

EXAMPLE 2.—FILLED-CURED E/VCl STOCKS

A study of varying types of black and non-black fillers with solid E/VCl at 50 parts loading was made to determine ones yielding best physical properties (Table III). The stock has 58 mole percent VCl and is plasticized with dioctyl phthalate to provide good low temperature properties to minimize decomposition. Otherwise the cure formulation shown in Table 1 was followed.

TABLE III.—FILLERS FOR E/VCl [1]

| Filler (50 parts, hpr.) | 15 min. cure at 310° F. | | | 25 min. cure at 310° F. | | |
|---|---|---|---|---|---|---|
| | Tensile, p.s.i. | Elong., percent | Perm. Set, percent | Tensile, lbs./in.² | Elong., percent | Perm. Set, percent |
| None, Control | 1,355 | 527 | 2.75 | 808 | 493 | 2.36 |
| Black Fillers: [2] | | | | | | |
| Philblack O [t] | 2,252 | 323 | 5.47 | 2,287 | 310 | 6.45 |
| Philblack E [t] | 2,660 | 307 | 6.07 | 2,850 | 280 | 6.07 |
| Philblack I [t] | 2,328 | 327 | 6.12 | 2,560 | 307 | 5.22 |
| Regal 300 [t] | 2,318 | 360 | 5.18 | 2,535 | 357 | 5.08 |
| Sterling V [t] | 1,823 | 363 | 4.41 | 2,060 | 347 | 4.13 |
| Black Pearls 81 [t] | 2,265 | 220 | 4.32 | 1,307 | 70 | 6.17 |
| Spheron 6 [t] | 2,765 | 360 | 5.00 | 1,873 | 177 | 3.58 |
| Spheron 9 [t] | 2,803 | 290 | 5.17 | 2,540 | 250 | 4.80 |
| Thermax [t] | 1,610 | 525 | 4.00 | 1,668 | 437 | 3.51 |
| Non-Black Fillers: [3] | | | | | | |
| McName Clay [t] | 1,686 | 538 | 10.75 | 1,980 | 580 | 8.62 |
| Calcene TM [t] | 2,335 | 660 | 6.37 | 2,338 | 657 | 5.37 |
| Hi Sil 233 [t] | 1,977 | 543 | 10.70 | 2,155 | 493 | 11.32 |
| Ti Pure 610 [t] | 2,090 | 637 | 4.71 | 2,048 | 587 | 3.71 |

[1] 58 mole percent VCl; softened with 15 parts DOP (dioctyl phthalate).
[2] Philback E=super abrasion oil furnace black; Philblack I=intermediate super abrasion furnace carbon black; Regal=fully reinforcing oil furnace black; Sterling V=general purpose furnace black; Black Pearls 81=regular color all-purpose processing channel black; Spheron 9=easy processing channel black; Thermax=a medium thermal carbon black.
[3] McName Clay=a soft kaolin clay; Calcene TM=precipitated calcium carbonate coated with a rubber soluble agent; Hi Sil 233=hydrated silica pigment of extremely fine particle size; Ti Pure 610=rutile TiO₂.

The furnace blacks give the highest degree of reinforcement and display relatively flat curves. The best reinforcement is by Philblack E[t] and best elongations are obtained with Regal 300[t]. Spheron 9[t] appears to be the best of the channel blacks.

Calcene TM[t] is the best non-black reinforcer tested. However all non-black fillers give respectable properties with good elongations.

Philblack E[t], Regal 300 R$_m$ and Calcene TM[t] were chosen for further study of optimum loading of the E/VCl formulation. These results are given in Table IV.

Results show respectable reinforcement and good elongation for a 30:20 ZnO-TiO$_2$ white sidewall formulation. A blend, 25 parts Philblack E[t] and 25 parts Calcene TM[t], give poorer tensile and elongation data than obtained for 50 parts of Calcene TM[t].

Small increases in sulfur in the formulation grossly speed cure rates and lead to overcures.

Use of Elastopar[t] in the formulation, in attempts to improve reinforcement, indicates that the heat treatment necessary to render Elastopar[t] effective is unacceptable for E/VCl stocks.

TABLE IV.—OPTIMUM FILLER LEVELS FOR E/VCl[5]

| Filler Parts, hpr. | 15 min. cure at 310° F. | | | | | | | 25 min. cure at 310° F. | | | | | | | |
|---|---|---|---|---|---|---|---|---|---|---|---|---|---|---|---|
| | Tensile, p.s.i. | P.s.i., Yield | Elong., Percent | Perm. Set | Modulus, p.s.i. | | | Shore A[1] Hard. | Tensile, p.s.i. | P.s.i., Yield | Elong., Percent | Perm. Set | Modulus, p.s.i. | | | Shore A[1] Hard. |
| | | | | | 100% | 300% | 500% | | | | | | 100% | 300% | 500% | |
| Philblack E:[t] | | | | | | | | | | | | | | | | |
| 25 | 2,470 | | 400 | 3.00 | 315 | 1,630 | | | 2,545 | | 363 | 3.03 | 364 | 1,908 | | 83 |
| 37.5 | 2,622 | 158 | 440 | | 504 | 1,999 | | 83 | 2,815 | 162 | 393 | | 565 | 2,438 | | |
| 50 | 2,665 | 214 | 356 | 6.07 | 770 | 2,569 | | 88 | 2,850 | | 280 | 6.07 | | | | 94 |
| 62.5 | 2,639 | 399 | 265 | | 1,338 | | | 94 | 2,815 | 403 | 247 | | 1,469 | | | |
| 75 | 2,243 | | 77 | 11.25 | | | | | 1,950 | 30 | | 15.55 | | | | |
| Regal 300:[t] | | | | | | | | | | | | | | | | |
| 25 | 2,438 | | 467 | 3.35 | 264 | 1,126 | | | 2,508 | | 400 | 2.87 | 286 | 1,320 | | 78 |
| 37.5 | 2,380 | 144 | 498 | | 378 | 1,465 | | 77 | 2,588 | 160 | 470 | | 417 | 1,757 | | |
| 50 | 2,352 | 160 | 432 | 5.18 | 583 | 2,065 | | 85 | 2,535 | | 357 | 5.08 | | | | 91 |
| 62.5 | 2,092 | 286 | 375 | | 904 | 2,070 | | 90 | 2,443 | 314 | 313 | | 1,025 | 2,399 | | |
| 75 | 2,175 | | 190 | 8.77 | 1,366 | | | | 2,415 | | 227 | 8.65 | 1,461 | | | |
| Calcene TM:[t] | | | | | | | | | | | | | | | | |
| 25 | 2,125 | | 633 | 3.68 | 146 | 219 | 472 | | 2,145 | | 625 | 3.52 | 143 | 212 | 454 | 66 |
| 37.5 | 1,947 | | 625 | | 191 | 278 | 522 | 63 | 2,137 | | 616 | | 172 | 263 | 588 | 72 |
| 50 | 2,196 | | 599 | 6.37 | 182 | 294 | 599 | 70 | 2,213 | | 610 | 5.37 | 190 | 297 | 682 | 73 |
| 62.5 | 1,961 | | 617 | | 214 | 509 | 654 | 72 | 2,019 | | 608 | | 211 | 336 | 769 | |
| 75 | 1,860 | | 653 | 7.83 | 211 | 328 | 720 | | 1,694 | | 637 | 8.13 | 202 | 328 | 720 | |

[1] Hardness determined with a Shore A Durometer; ASTM D676-49T.

Optimum loadings for Philblack E[t] and Calcene TM[t] are close to 50 parts based on achievement of highest tensiles. The best performance for Regal 300[t] appears to be obtained with closer to 40 parts.

Several formulation and curing condition variables were investigated (Table V).

Using Philblack O[t] as filler a study was made of preheat times in the mold prior to raising to full pressure. Specimen appearance and physical properties obtained using 90, 60, 30 and 15 sec. of warm-up time in the press at low pressure were noted. There is some evidence that cure has begun and flow is restricted at the 90 sec. level. Best results are obtained at 60 and 30 sec. while 15 sec. is insufficient to heat to temperature for best flow.

TABLE V.—MISCELLANEOUS E/VCl[5] FORMULATION STUDY

| Variation of Standard Cure Formula[1] | 15 min. cure at 310° F. | | | | | | 25 min. cure at 310° F. | | |
|---|---|---|---|---|---|---|---|---|---|
| | Tensile lbs./in.[2] | Perm. Set, percent | Elong., percent | Modulus | | | Tensile lbs./in.[2] | Perm. Set, percent | Elong., percent |
| | | | | 100 | 300 | 500 | | | |
| ZnO, 30 parts hpr | 1,607 | 3.96 | 563 | 154 | 245 | 726 | 1,861 | 3.86 | 570 |
| Ti-Pure,[t] 20 parts hpr | | | | | | | | | |
| Philblack E,[t] 25 parts hpr | 2,120 | 6.97 | 545 | 336 | 1,045 | 2,042 | 2,313 | 6.06 | 500 |
| Calcene TM,[t] 25 parts hpr | | | | | | | | | |
| Philblack E,[t] +1.5 parts hpr. sulfur: | | | | | | | | | |
| 7.5 min. cure | 2,442 | | 363 | 712 | 2,280 | | | | |
| 15 min. cure | 2,342 | 4.62 | 180 | 1,214 | | | | | |
| 25 min. cure | +1,607 | 4.61 | 130 | 1,264 | | | | | |
| Philblack E,[t] 50 phr | 1,529 | 3.61 | 63 | | | | 1,524 | 6.67 | 30 |
| Elastopar R,[t] 1.5 phr | | | | | | | | | |
| Philblack O,[t] 50 parts—Sec. preheat prior to full pressure cure: | | | | | | | | | |
| 90 | 2,252 | | 323 | 678 | 2,280 | | | | |
| 60 | 2,313 | | 378 | 703 | 2,283 | | | | |
| 30 | 2,309 | | 377 | 672 | 2,234 | | | | |
| 15 | 2,257 | | 378 | | | | | | |

[1] Standard Formula Ingred.:

| | Parts |
|---|---|
| E/VCl | 115 |
| Softener | 5 |
| ZnO | 2 |
| Stearic Acid | 1.25 |
| Sulfur | 1.5 |
| Thiurad[t] | 1 |
| Mertax[t] | |

EXAMPLE 3.—E/VCl CURE STABILIZERS

The effects of various potential stabilizers were determined using both 51–57 mole percent (Table VI) and 35 mole percent VCl copolymer, (Table VII). Performance is evaluated by an oven cure (30 min. at 310° F.) with ca. ¼ g. samples being compressed between rolled steel plates.

The best stabilizers for prevention of char and metal attack are, in approximate order of their effectiveness: thiourea, pentaerythritol, glycerine, Resimene U–920 [t], Epoxol 9–5 [t], dimethylol urea, urea, etc. One part of effective additive appears sufficient.

Stabilizer combinations were studied for prevention of polymer decomposition and corrosive attack of molds.

TABLE VI.—E/VCl CURE STABILIZERS FOR 51–57 MOLE PERCENT VCl COPOLYMER

| Run | Stabilizer (1 phr. for each additive)[1] | Elong., Percent | Permanent Set, Percent | Tensile, lbs./in. | Metal Plate Char Test[2] | | |
|---|---|---|---|---|---|---|---|
| | | | | | Char Ring | Metal Attack | Color |
| A. 57% VCl copolymer with 15 pts. DOP (dioctyl phthalate) cured 25 min. at 310° F. | | | | | | | |
| 1 | None-control | Charred on cure | | | | | |
| 2 | Pentaerythritol | 627 | 2.77 | 1,849 | V.Sl. | H. | Brn. |
| 3 | Glyceryl monolaurate | 540 | 1.69 | 1,284 | ⅛" | V.Sl. | Lt. |
| 4 | Glycerine | 650 | 2.77 | 1,924 | V.Sl. | M. | M. |
| 5 | Advastab CH–300 [t] | 520 | 2.31 | 980 | 100% | Sl. | Lt. |
| 6 | Quadrol [t] | No cure | No char | | | H. | Brn. |
| 7 | Elvanol 70–05 [t] | 573 | 2.74 | 1,408 | ⅛" | H. | M. |
| 8 | {Pentaerythritol, Santowhite Crystals [t]} | 647 | 2.83 | 1,772 | 1/16" | V. Sl. | Lt. |
| 9 | {Glycerine, Santowhite Crystals [t]} | 646 | 2.81 | 2,023 | 1/32" | Sl. | Lt. |
| 10 | Santowhite Crystals [t] | 467 | 1.78 | 860 | 100% | H. | Brn. |
| B. 51% VCl Copolymer with 15 pts. DNODA [di(n-octyl, n-decyl)adipate]; cured 25 min. at 310° F.; Additive (2 pts.) | | | | | | | |
| 11 | Resimene U–920 [t] | 670 | 2.59 | 1,696 | V. Sl. | None | Lt. |
| 12 | Epoxol 9–5 [t] | 700 | 2.62 | 2,048 | 1/16" | Sl. | Lt. |
| 13 | Urea | 627 | 3.56 | 920 | None | Sl. | Lt. |
| 14 | Thiourea | 650 | 3.33 | 1,321 | do | None | Lt. |
| 15 | Sucrose octa-acetate | 623 | 2.35 | 1,800 | ⅛" | ⅛" H. | Lt. |
| 16 | Dimethylol urea | 657 | 3.04 | 1,431 | 1/32" | V. Sl. | Lt. |
| 17 | Glycerine | 667 | 3.15 | 1,499 | Trace | V. Sl. | Lt. |
| 18 | None-control | 627 | 2.50 | 1,820 | 3/16" | ⅛" H. | Brn. |

[1] Advastab CH–300=an organic phosphite; Quadrol=reaction product of ethylene diamine with 4 molecules of propylene oxide; Elvanol 70–05= partially hydrolyzed polyvinyl acetate; Santowhite Crystals=4,4'-thiobis-(6-tert-butyl-meta-cresol); Resimene U–920=a butylated urea-formaldehyde resin; Epoxol 9–5=epoxidized soybean oil.
[2] Approximately ¼ g. samples, cured 30 min. at 310° F., in direct contact with rolled-steel plates; Sl.=slight; V. Sl.=very slight; M.=moderate; Lt.=light; H=heavy; Brn.=brown.

TABLE VII.—E/VCl CURE STABILIZERS FOR 35 MOLE PERCENT VCl COPOLYMER

| Run | Stabilizer and Additives | Cure Time (min.) | Elong., Percent | Perm., Set, Percent | Tensile, lbs./in.² | Metal Plate Char Test[1] | | |
|---|---|---|---|---|---|---|---|---|
| | | | | | | Char Ring | Metal Attack | Color |
| A. (35% E/VCl) no plasticizer Stabilizer (2 phr.) | | | | | | | | |
| 1 | Dibasic lead phosphate | 25 | 750 | 4.63 | 1,073 | None | V. Sl. | Pink |
| 2 | Dibasic lead phosphate | 50 | 743 | 4.26 | 1,077 | | | |
| 3 | Epoxol 9–5 [t] | 25 | 747 | 3.53 | 1,212 | None | V. Sl. | Lt. |
| 4 | do | 50 | 790 | 3.42 | 1,021 | | | |
| 5 | Resimene U–920 [t] | 25 | 667 | 2.91 | 1,187 | None | V. Sl. | Lt. |
| 6 | do | 50 | 680 | 2.72 | 1,219 | | | |
| 7 | None-control | 25 | 657 | 2.55 | 1,396 | ⅛" | H. | Brn. |
| B. (35% E/VCl) compounded with 50 phr. Philblack E Additives | | | | | | | | |
| | | | | | | Clash-Berg Properties[2] | | |
| | | | | | | $T_f$, °C. | $T_{2,000}$, °C. | SR, °C. |
| 8 | None | 25 | 50 | 6.0 | 1,947 | −23 | >220 | >243 |
| 9 | 15 phr. DNODA | 25 | 160 | 1.25 | 828 | −41.5 | 78 | 119.5 |
| 10 | 15 phr. DNODA, 1 phr. U–920 [t] | 25 | 300 | 3.00 | 1,483 | −40.5 | 7 | 47.5 |

[1] Approximately ¼ g. samples, cured 30 min. at 310° F., in direct contact with rolled-steel plates; V.Sl.=very slight; Lt.=light; H=heavy; Brn.=brown.
[2] Clash-Berg modulus data gives information of the torsional stiffness of the polymer as related to temperature. The $T_f$ value is the temperature at which the polymer just begins to have some slight degree of flexibility. The $T_{2,000}$ value is the temperature at which the material becomes very rubbery and non-load bearing. The Stifflex range ($T_f - T_{2,000}$) represents the temperature range over which the polymer is reasonably tough, i.e., high in impact strength, and at the same time rigid enough to bear some load.

Results (Table VIII) show thiourea and glycerine to be most effective. Epoxol 9-5 ᵗ also shows promising utility.

TABLE VIII.—CURE STABILIZERS [1]

| Run | Stabilizer Additives [2] | Elong., Percent | Perm. Set, Percent | Tensile, p.s.i. | Metal Plate Oven Test [3] | | |
|---|---|---|---|---|---|---|---|
| | | | | | Char Ring | Metal Att. | Color |
| 1 | E (½) T (½) | 677 | 3.25 | 1,595 | None | None | Pink |
| 2 | G (½) T (½) | 693 | 2.93 | 1,900 | None | V. Sl. | Lt. |
| 3 | G (½) R (½) | 663 | 2.72 | 1,799 | 1/32" | V. Sl. | Lt. |
| 4 | E (½) R (½) | 670 | 2.69 | 1,811 | 1/8" | 1/16" | Lt. |
| 5 | E (½) | 837 | 4.38 | 1,572 | 1/32" | V. Sl. | Lt. |
| 6 | T (½) | 670 | 2.64 | 1,798 | 1/32" | V. Sl. | Lt. |
| 7 | E (½) R (½) | 695 | 2.59 | 2,083 | None | V. Sl. | Lt. |
| 8 | E (½) G (½) | 663 | 2.72 | 1,652 | None | V. Sl. | Pink |
| 9 | E (1) | 700 | 3.43 | 1,552 | 1/8" | 1/8" | Lt. |
| 10 | T (1) | 680 | 4.02 | 1,510 | Sl. | V. Sl. | Lt. |
| 11 | G (1) | 710 | 3.52 | 1,271 | Sl. | V. Sl. | Lt. |

[1] E/VCl stock is 51 mole percent VCl compounded with 15 pts. DNODA [di(n-octyl, n-decyl)adipate] and standard cure formula. Cured 25 min. at 310° F.
[2] Stabilizers as follows: E, Epoxol 9-5 ᵗ; G, glycerine; R, Resimene U-920 ᵗ; S, Santowhite Crystals ᵗ; T, thiourea. Figures in parenthesis are parts per hundred parts of polymer.
[3] Approximately ¼ g. samples, cured 30 min. at 310° F., in direct contact with rolled-steel plates; Sl.=slight; V. Sl.=very slight; Lt.=light.

Effects of stabilizers on cure rates were measured (Table IX). Glycerine, Resimene U-920 ᵗ, and thiourea retard cure rate to increasing degree in the order given.

TABLE IX.—CURE STABILIZERS [1]

| Run | Stabilizer Additives [2] | Mooney Cure [3] | | | | Physical Properties | | | | | Metal Plate Oven Test [4] | | |
|---|---|---|---|---|---|---|---|---|---|---|---|---|---|
| | | Temp., °F. | t₅ (min.) | tZ₃₀ (min.) | Time (min.) | Cure Temp. (°F.) | Cure Time, min. | Elong., percent | Perm. Set, percent | Tensile (p.s.i.) | Char Ring | Metal Att. | Color |
| 1 | Control | 310 | 7.4 | 2.3 | 21.2 | 310 | 20 | 620 | 1.61 | 1,650 | Total | H. | Brn. |
| 2 | S (½) T (½) | 310 | 6.8 | 5.9 | 42.2 | 310 | 25 | 647 | 2.11 | 1,594 | 1/16" | Sl. | Lt. |
| 3 | S (½) T (½) E (1) | | | | | 310 | 35 | 633 | 2.37 | 1,117 | 1/8" | H. | Lt. |
| 4 | E (1) S (½) | 310 | 6.8 | 3.1 | 21.7 | 310 | 20 | 663 | 2.42 | 1,473 | None | None | Lt. |
| 5 | E (1) S (½) G (½) | 310 | 7.6 | 4.5 | 34.6 | 310 | 35 | 677 | 1.77 | 1,514 | | | |
| 6 | E (1) S (½) R (½) | 310 | 8.0 | 4.2 | 33.2 | 310 | 35 | 610 | 1.80 | 1,592 | | | |

[1] E/VCl stock is 51 mole percent VCl compounded with 15 pts. DNODA [di(n-octyl, n-decyl)adipate] and standard cure formula. Cured 25 min. at 310° F.
[2] Stabilizers as follows: E, Epoxol 9-5 ᵗ; G, glycerine; R, Resimene U-920 ᵗ; S, Santowhite Crystals ᵗ; T, thiourea. Figures in parenthesis are parts per hundred parts of polymer.
[4] Approximately ¼ g. samples, cured 30 min. at 310° F., in direct contact with rolled-steel plates; Sl.=slight; Lt.=light; H=heavy; Brn.=brown.

Additional data on stabilization of E/VCl cures is given in Table X. Pentaerythritol dissolved in glycerine shows improved compatibility and imparted good stability. Black-filled stabilized compounded stock have good performance in transfer molding.

TABLE X.—CURE STABILIZATION OF E/VCl (51 MOLE PERCENT VCl)

| Run | Stabilizers [1] (phr.) | Cure Time (min. at 310° F.) | Physical Properties | | | Metal Plate Test [2] | | |
|---|---|---|---|---|---|---|---|---|
| | | | Elong., Percent | Perm. Set, Percent | Tensile, lbs./in.² | Char Ring (in.) | Metal Attack | Color |
| 1 | Epoxol 9-5 ᵗ (0.5), Resimene U-920 ᵗ (0.5) | 25 | 617 | 1.94 | 1,648 | None | V.Sl. | Lt. |
| 2 | Epoxol 9-5 ᵗ (0.5), glycerine (0.5) | 25 | 587 | 2.72 | 920 | do | V.Sl. | Lt. |
| 3 | SAIB | 25 | 617 | 1.95 | 1,402 | do | None | Lt. |
| 4 | Pentaerythritol (0.5) glycerine (0.5) | 25 | 680 | 1.62 | 1,784 | 1/16 | Sl. | Lt. |
| 5 | Trimethylolpropane diallyl ether | 70 | | | | None | V.Sl. | Lt. |
| 6 | Trimethylolpropane monoallyl ether | 140 | | | | do | V.Sl. | Lt. |

[1] SAIB=sucrose acetate isobutyrate.
[2] Approximately 1/4 g. samples, cured 30 min. at 310° F., in direct contact with rolled-steel plates; Sl.=slight; V.Sl.=very slight; Lt.=light.

What is claimed is:

1. A process for preparing crosslinked ethylene/vinyl chloride copolymers which comprises curing an ethylene/vinyl chloride copolymer having about 5 to 95 mole percent polymerized vinyl chloride in the presence of a stabilizer selected from the group consisting of butylated urea-formaldehyde resin, pentaerythritol, glycerine, phenol, bisphenol, urea, thiourea and dimethylolurea and in the presence of a sulfur cure system containing elemental sulfur.

2. The process of claim 1 where the copolymer contains a filler.

3. The process of claim 1 where the copolymer contains a plasticizer.

4. The process of claim 1 where the cure temperature is on the order of about 150° to 450° Fahrenheit.

5. A process according to claim 1 wherein said ethylene/vinyl chloride copolymer has about 20 to 60 mole percent polymerized vinyl chloride and wherein said sulfur cure system comprises elemental sulfur and an activator.

6. The process of claim 5 where the copolymer contains about 1 to 10 parts of stabilizer per 100 parts of copolymer.

7. The process of claim 5 where the copolymer contains about 0.5 to 5 parts of sulfur and about 0.5 to 5 parts of accelerator per 100 parts of copolymer.

8. The process of claim 5 where the cure temperature is on the order of about 150° to 450° Fahrenheit.

9. A process for preparing crosslinked ethylene/vinyl chloride copolymers which comprises curing an ethylene/vinyl chloride copolymer which has about 20 to 60 mole percent vinyl chloride and which contains about 1 to 10 parts per 100 parts of copolymer of a stabilizer selected from the group consisting of butylated urea-formaldehyde resin, pentaerythritol, glycerine, phenol, bisphenol, urea, thiourea and dimethylolurea with a sulfur cure system comprising about 0.5 to 5 parts of sulfur and about 0.5 to 5 parts of accelerator per 100 parts of copolymer where the cure temperature is on the order of about 150° to 450° Fahrenheit.

10. The process of claim 9 where the copolymer contains from about 50 to 550 parts of filler.

11. The process of claim 9 where the copolymer contains from about 10 to 60 parts of plasticizer.

12. The process of claim 9 where the sulfur cure system is also comprised of about 1 to 3 parts of activator.

13. The process of claim 9 where about 1 to 4 parts of sulfur and about 1 to 3 parts of accelerator is used.

14. The process of claim 9 where the cure temperature is in the range from about 250° to 350° Fahrenheit.

15. A process for preparing crosslinked ethylene/vinyl chloride copolymers which comprises curing an ethylene/vinyl chloride copolymer which has about 20 to 60 mole percent vinyl chloride and which contains about 1 to 5 parts per 100 parts of copolymer of a stabilizer selected from the group consisting of butylated urea-formaldehyde resin, pentaerythritol, glycerine, phenol, bisphenol, urea, thiourea and dimethylolurea with a sulfur cure system comprising about 1 to 3 parts of sulfur, about 1 to 3 parts of accelerator, and about 1 to 3 parts of activator per 100 parts of copolymer where the cure temperature is in the range from about 250° to 350° Fahrenheit.

16. The process of claim 15 where the copolymer contains about 25 to 100 parts of filler.

17. The process of claim 15 where the copolymer has about 10 to 30 parts of plasticizer.

References Cited
UNITED STATES PATENTS

| | | | |
|---|---|---|---|
| 2,405,008 | 7/1946 | Berry et al. | 260—79.5 |
| 2,416,878 | 3/1947 | Lindsey et al. | 260—79.5 |

JOSEPH L. SCHOFER, *Primary Examiner.*

D. K. DENENBERG, *Assistant Examiner.*

UNITED STATES PATENT OFFICE
CERTIFICATE OF CORRECTION

Patent No. 3,356,658                                                     December 5, 1967

Harry M. Andersen et al.

It is certified that error appears in the above identified patent and that said Letters Patent are hereby corrected as shown below:

Column 4, line 45, "1/3" should read -- 1/2 --. Column 4, line 46, "320" should read -- 310 --. Columns 5 and 6, TABLE I, third column, line 5 thereof, "2.0" should read -- 4.5 --; same table, second column, line 1 thereof, opposite "E/VCl" insert -- 100 --. Columns 5 and 6, footnote to TABLE III, line 3 thereof, after "Regal" insert -- 300 --. Columns 7 and 8, TABLE V, second column, line 5 thereof, "+1,607" should read -- 1,607 --.

Signed and sealed this 10th day of March 1970.

(SEAL)
Attest:

EDWARD M. FLETCHER, JR.                           WILLIAM E. SCHUYLER, JR.
Attesting Officer                                          Commissioner of Patents